(12) United States Patent
Nagamatsu et al.

(10) Patent No.: US 7,989,998 B2
(45) Date of Patent: Aug. 2, 2011

(54) ENCODER WITH MOTOR

(75) Inventors: Yoshiyuki Nagamatsu, Fukuoka (JP);
 Mitsuhiro Matsuzaki, Fukuoka (JP);
 Yukio Tsutsui, Fukuoka (JP); Shirou Yoshidomi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 178 days.

(21) Appl. No.: 12/538,169

(22) Filed: Aug. 10, 2009

(65) Prior Publication Data
 US 2010/0060112 A1    Mar. 11, 2010

(30) Foreign Application Priority Data

Sep. 11, 2008 (JP) .................................. 2008-233458
Jun. 16, 2009 (JP) .................................. 2009-143215

(51) Int. Cl.
 *H02K 11/00* (2006.01)
(52) U.S. Cl. ..................... 310/68 B; 310/68 C; 310/90
(58) Field of Classification Search ................ 310/68 B, 310/68 R, 68 C, 89–90
 See application file for complete search history.

(56) References Cited

U.S. PATENT DOCUMENTS

| 5,440,185 | A  | * | 8/1995  | Allwine, Jr. ............. 310/156.37 |
| 5,532,533 | A  | * | 7/1996  | Mizutani ..................... 310/68 B |
| 5,672,135 | A  | * | 9/1997  | Hamada ........................ 475/149 |
| 5,914,548 | A  | * | 6/1999  | Watanabe et al. ............... 310/88 |
| 6,225,715 | B1 | * | 5/2001  | Hoda et al. .................. 310/67 R |
| 6,803,685 | B2 | * | 10/2004 | Ikawa et al. ................. 310/68 B |
| 7,663,276 | B2 | * | 2/2010  | Igarashi ..................... 310/68 B |
| 7,683,512 | B2 | * | 3/2010  | Gao et al. ................... 310/68 B |
| 2005/0218736 | A1 | * | 10/2005 | Message et al. ............. 310/90.5 |
| 2008/0144019 | A1 | * | 6/2008  | Nakamura et al. ............ 356/138 |

FOREIGN PATENT DOCUMENTS

JP    2000-116066    4/2000

* cited by examiner

*Primary Examiner* — Thanh Lam
(74) *Attorney, Agent, or Firm* — Ditthavong Mori & Steiner, P.C.

(57) ABSTRACT

With a motor with an encoder of the invention, a stopper gap formed between a stopper formed on an outer circumferential surface of a hub of the encoder and a bearing cover of an anti-load side bracket is set smaller than an encoder gap to prevent that a rotating disk is made contact with a fixed slit even when an excessive force is applied to an output shaft of the motor with the encoder.

7 Claims, 5 Drawing Sheets

ENCODER WITH MOTOR

The present application contains subject matter related to that disclosed in Japanese Priority Patent Application JP 2008-233458 and JP 2009-143215 filed in the Japan Patent Office on Sep. 11, 2008, and Jun. 16, 2009, the entire contents of which is hereby incorporated by reference.

BACKGROUND OF THE INVENTION

1. Field of the Invention

The present invention relates to a motor of an axial gap type equipped with an encoder of an optical type.

2. Description of the Related Art

For example, as disclosed in JP A-2000-116066, in order to control rotation of a rotor constituting an output shaft of a motor with high accuracy, a motor with an encoder has been often employed in the past. The motor with an encoder is an axial gap type and is equipped with an encoder of an optical type at an anti-load side of the motor.

The optical encoder is equipped with an LED at a light emitting side, and a photodiode and a signal processing board at a light receiving side, and a rotating disk made of a glass in which slits for providing high resolution are curved at a fine pitch and a fixed slit are oppositely disposed at a very small encoder gap of about 75 μm. The encoder detects a relative movement of the rotating disk and the fixed slit to read the moving amount of the rotor of the motor.

SUMMARY OF THE INVENTION

According to an aspect of the invention, there is provided a motor with an encoder including a motor, and an encoder disposed at an anti-load side of the motor. The motor includes an output shaft rotatably supported by a load side bearing and an anti-load side bearing, and an anti-load side bracket including a bearing cover for supporting the anti-load side bearing by an inner circumferential part and covering an anti-load side part of the anti-load side bearing, the encoder includes a rotating part coupled with the output shaft and a fixed part attached to the anti-load side bracket, the rotating part includes a hub fixed at an end of the output shaft at the anti-load side, a shaft center of the hub being matched with a shaft center of the output shaft, and a rotating disk fixed at an anti-load side end of the hub, the fixed part includes a fixed slit disposed at a load side of the rotating disk via an encoder gap in a shaft direction, the hub includes a stopper that is bumped against the bearing cover of the anti-load side bracket when the output shaft is moved in a load side shaft direction, and the stopper is formed to protrude from an outer circumferential surface of the hub, and a stopper gap which is a moving distance of the stopper that is moved in the load side shaft direction to bump against the anti-load side bracket is smaller than the encoder gap.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
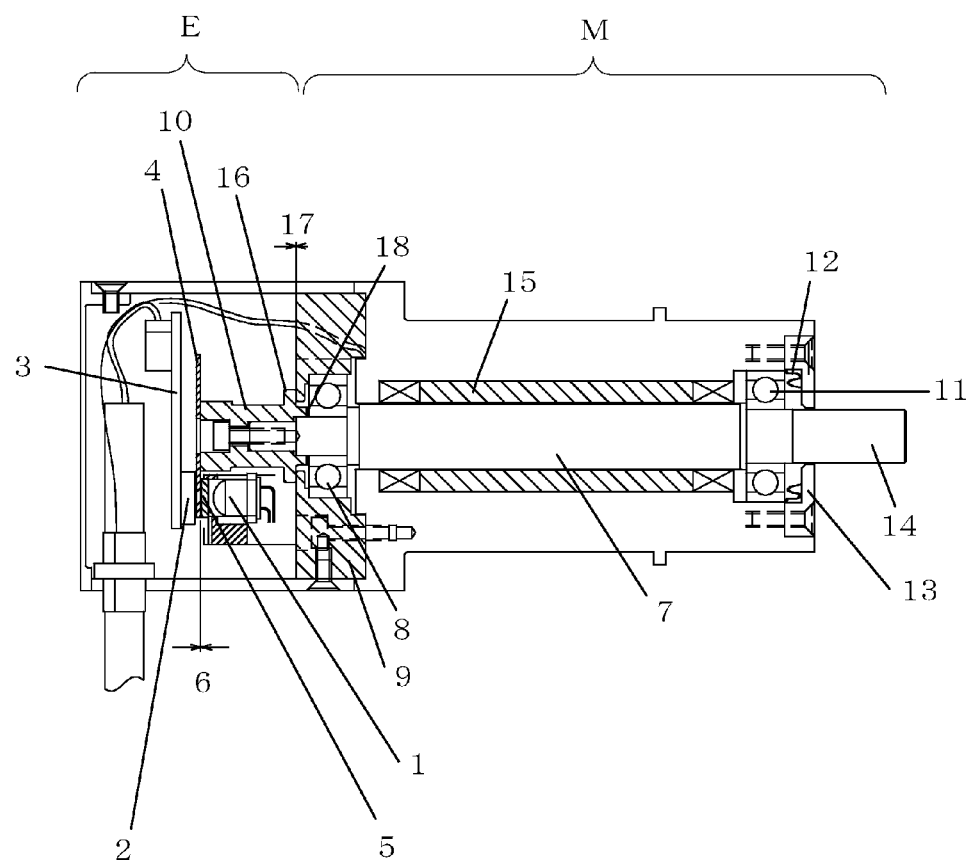
FIG. 1 is a side sectional view showing the structure of a motor with an encoder according to a first embodiment.

Embodiments will now be described with reference to the accompanying drawings, wherein like reference numerals designate corresponding or identical elements throughout the various drawings.

First Embodiment

Figure 2:
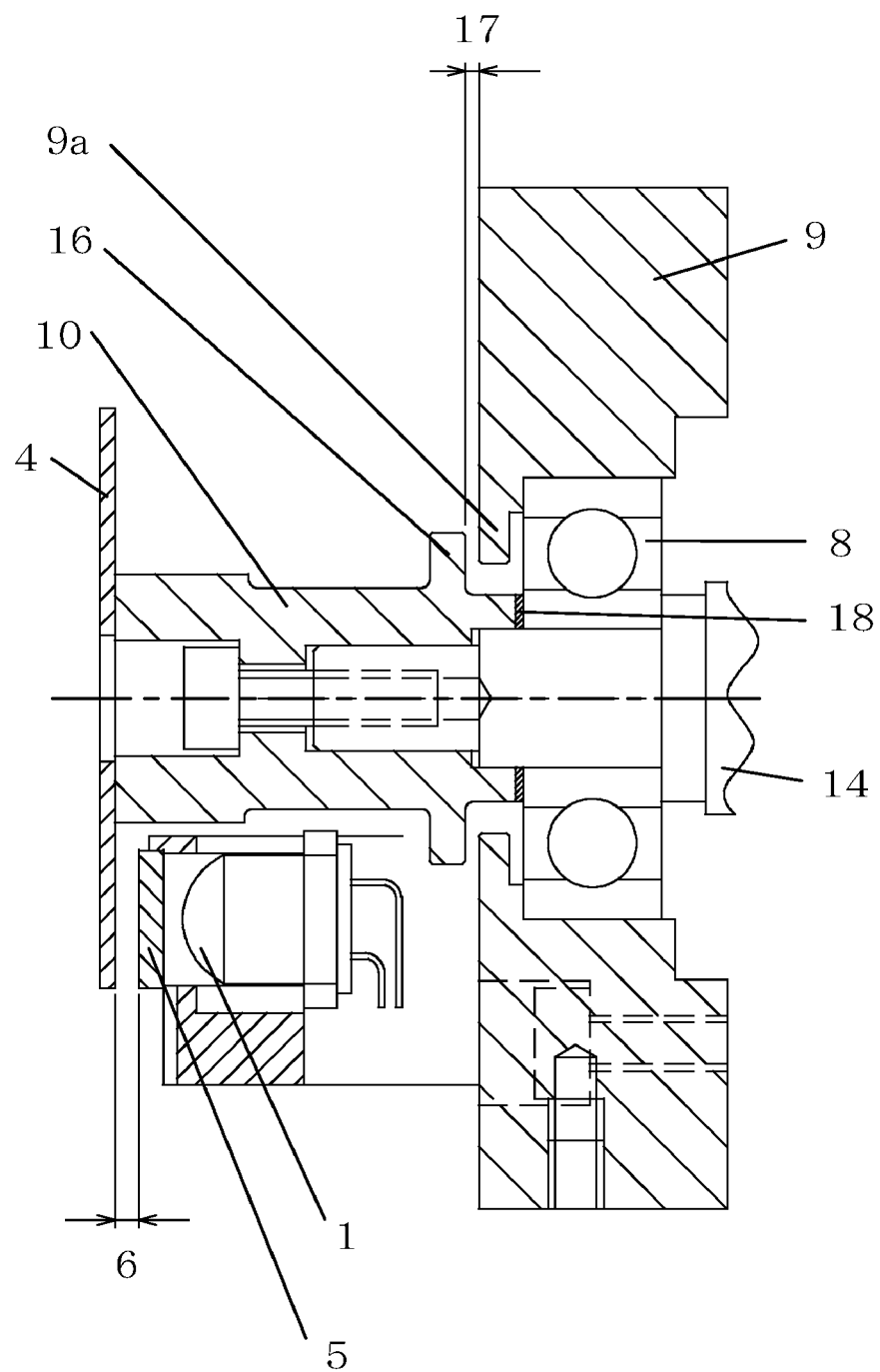
FIG. 2 is an enlarged cross sectional view showing a main part of the encoder of FIG. 1.

FIG. 1 is a sectional side view showing the structure of a motor with an encoder according to a first embodiment. FIG. 2 is an enlarged cross sectional view showing a main part of the encoder of FIG. 1.

In FIGS. 1 and 2, M denotes a motor, and E denotes an optical type encoder disposed at the anti-load side of the motor M. The motor M includes a load side bearing 11 and an anti-load side bearing 8 rotatably supporting an output shaft 14 of a rotor 7, and includes an anti-load side bracket 9 having a bearing cover 9a supporting the anti-load side bearing 8 by an inner circumferential part and covering an anti-load side part of the anti-load side bearing 8. Reference numeral 13 denotes a load-side bracket, and reference numeral 15 denotes a stator coil opposing to the outer circumferential surface of the rotor 7 in the radial direction.

A hub 10 is fixed at an end of the output shaft 14 of the motor M at the anti-load side so that the shaft center is matched with the shaft center of the output shaft 14, and a rotation disk 4 is attached at an anti-load side end of the hub 10. A rotating part of the encoder E is equipped with the hub 10 and the rotating disk 4.

A fixed part of the encoder E is attached to the anti load side bracket 9, and is equipped with a fixed slit 5 disposed at the load side of the rotating disk 4 via an encoder gap 6 in the shaft direction. The fixed slit 5 is fixed to the anti-load side bracket 9 directly or via a supporting member. Note that the supporting member is not shown in the drawings. A photodiode 2 at the light receiving side is disposed on a signal processing board 3 so as to oppose to the fixed slit 5 via a gap. The signal processing board 3 is directly fixed to the anti-load side bracket 9 or is fixed via a supporting member not shown. Further, at the load side direction of the fixed slit 5, an LED 1 at the light emitting side is fixed to the anti-load side bracket 9 directly or via a supporting member not shown. The fixed part of the encoder E is equipped with the LED 1, the fixed slit 5, the photodiode 2, and the signal processing board 3.

The fixed slit 5 and the rotating disk 4 is oppositely disposed via the very small encoder gap 6 of about 75 μm in order to provide high accuracy. Each of the load side bearing 11 and the anti-load side bearing 8 supporting the output shaft 14 has an axial gap of about 100 μm, and an outer ring of the anti-load side bearing 8 is bonded with the anti-load side bracket 9 and an inner ring thereof biases and fixes the hub 10. An inner ring of the load side bearing 11 is bonded with the rotor 7 and an outer ring thereof is not fixed, and a pre load is applied to the both bearings 11, 8 by a waveform washer 12 to restrain vibration of the rotor 7 when rotating.

In the embodiment, a stopper 16 that bumps against the anti-load side bracket 9 when the output shaft 14 is moved in the load side shaft direction is formed on the outer circumferential surface of the hub 10 to protrude from the outer circumferential surface. Further, a stopper gap 17 which is a moving distance of the stopper 16 that is moved in the load side shaft direction to bump against the anti-load side bracket 9 is set to a gap (about 40 μm) smaller than the encoder gap 6. Herewith, even when an excessive thrust force is applied to the output shaft 14 of the motor M in the load side direction and the rotor 7 is moved in the load side direction, the stopper 16 bumps against the anti-load side bracket 9 at first and the rotating disk 4 made of a glass can be prevented from being collided with the fixed slit 5 to be protected.

Further, if the stopper 16 is formed by a metal, when an excessive force is applied to the motor M during rotating and the stopper 16 is made contact with the bearing over 9a of the anti-load side bracket 9, the member may be chipped and metal powder may be entered into the bearing or the like to cause an operational error. However, by forming the stopper 16 with a self-lubricated material, or by coating a self-lubricated material on a bumped surface of the stopper 16 against the bearing cover 9a of the anti-load side bracket, generation of abrasion powder can be prevented, and the motor can be continuously used even when an excessive thrust force is applied during rotating.

Figure 3:
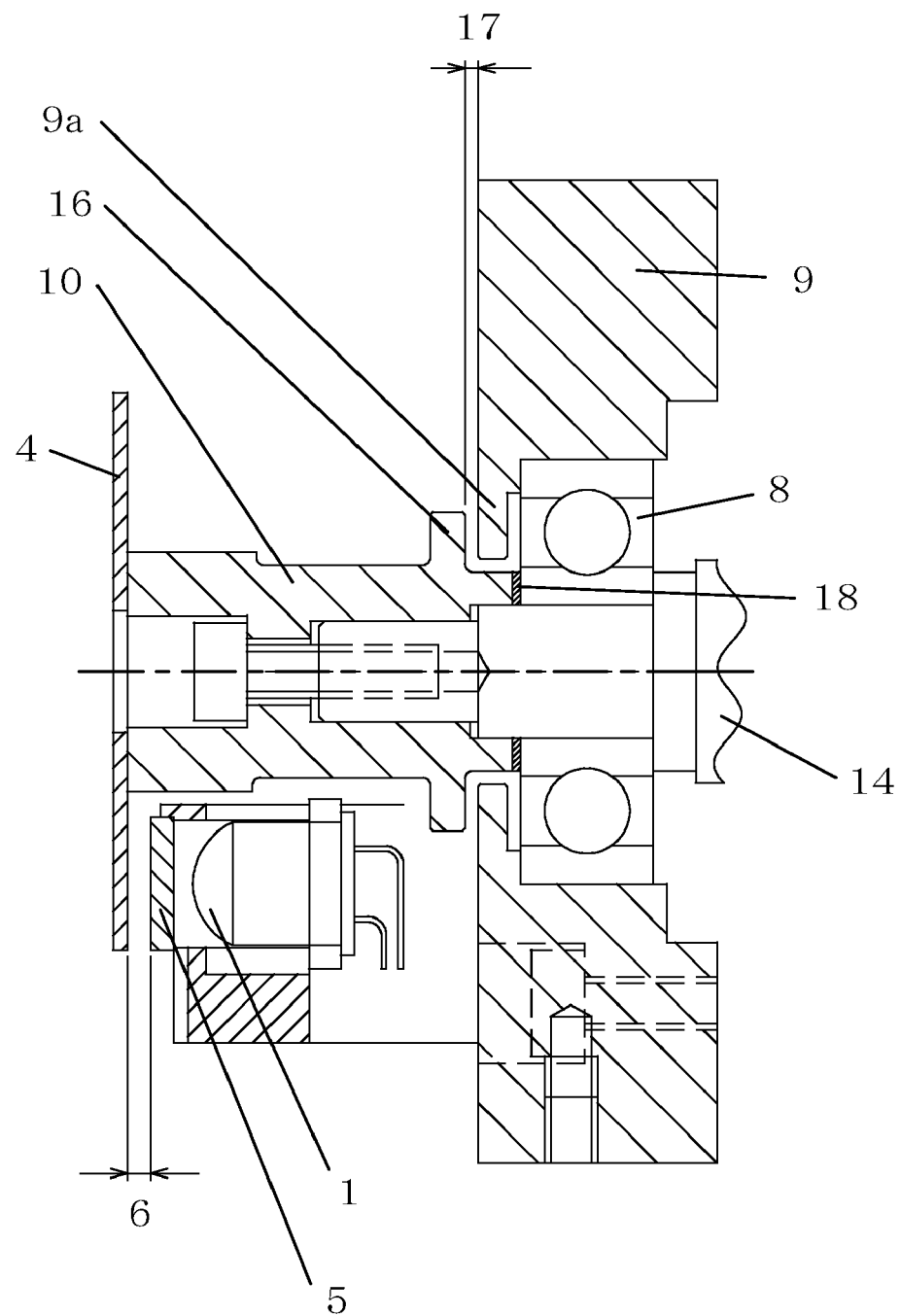
FIG. 3 is an enlarged cross sectional view showing a main part of an encoder of another example.

Further, as shown in FIG. 3, by forming a labyrinth structure with a gap formed between the outer circumferential surface of an end of the hub 10 at the anti-load side bearing side and the inner circumferential surface of the bearing cover 9a, and the stopper gap 17, invasion of grease of the anti-load side bearing 8 into the encoder E can be prevented. Herewith, the quality of the encoder E can be assured.

An adjustment method of the stopper gap 17 will be described. The hub 10 is preliminarily manufactured to be a smaller size, and is temporally assembled. Then, the gap value is measured and a shim 18 having a ring shape is inserted, thereby fine adjusting the stopper gap 17. Herewith, the assembling operation can be easily performed.

With the structure, regardless of the values of the axial gap of the bearing single body and the like, it is possible to design the encoder gap 6 so as to be small, and high accuracy of the encoder can be provided. Further, when the hub 10 on which the stopper 16 is attached and the load side bracket 13 are unfixed, the rotor 7 can be taken out in the load side direction. Accordingly, the structure is superior for maintenance and grease can be easily supplied, which gives a long life to the motor.

Second Embodiment

Figure 4:
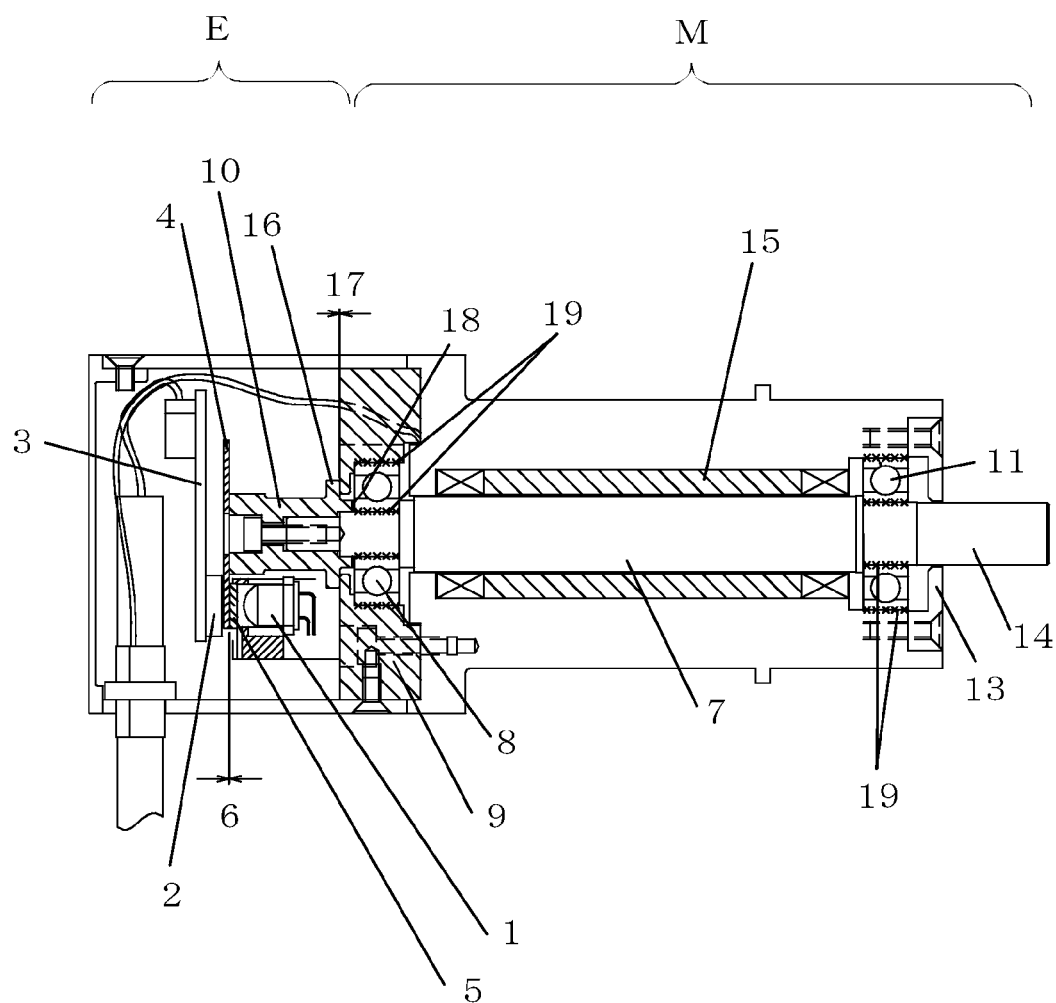
FIG. 4 is a side sectional view showing the structure of a motor with an encoder according to a second embodiment.

FIG. 4 is a sectional cross view showing the structure of a motor with an encoder according to a second embodiment.

In the second embodiment, similarly to the first embodiment, the stopper 16 is formed on the hub 10 fixing the rotating disk 4 to protect the rotating disk 4 made of a glass. In addition, instead of applying a pre load to the load side bearing 11 and the anti-load side bearing 8 supporting the output shaft 14 of the rotor 7 with the waveform washer 12, the inner rings and outer rings of the both bearings 11, 8 are respectively bonded by adhesive agent 19 in the state where a pre load is applied by a jig. Herewith, even when a thrust force is applied to the output shaft 14 of the motor in the load side direction, or when used for a long period, the encoder gap 6 can be always kept at a certain level, which makes it possible to provide higher accuracy and to improve quality of the encoder.

Note that in the case where the bearings are fixed only by adhesive, there is a limit in strength with respect to an impact force applied to the output shaft 14 of the rotor 7. However, even when an excessive force is applied and the adhesive of the both bearings 11, 8 are peeled off, the stopper 16 provided on the hub 10 is bumped against the anti-load side bracket 9, so that it can be prevented that the rotating disk 4 made of a glass is made contact with the fixed slit 5 to be damaged.

Third Embodiment

Figure 5:
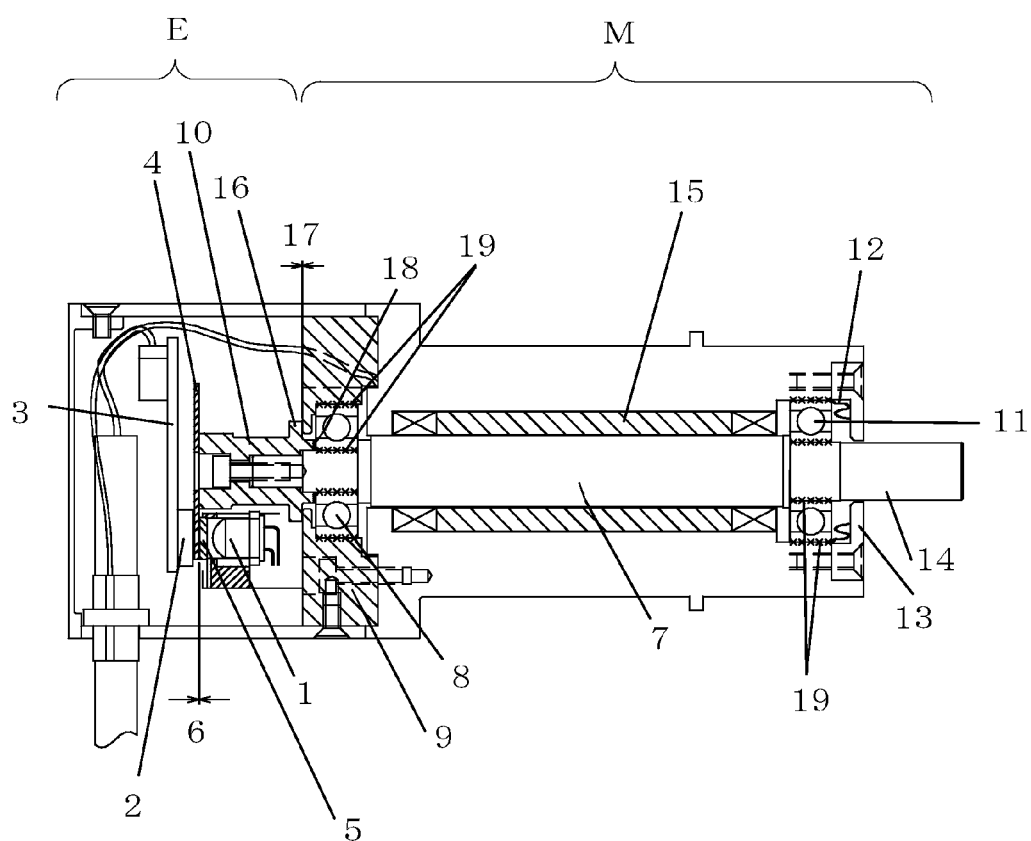
FIG. 5 is a side sectional view showing the structure of a motor with an encoder according to a third embodiment.

FIG. 5 is a sectional cross view showing the structure of a motor with an encoder according to a third embodiment. Similarly to the second embodiment, the stopper 16 is formed on the hub 10 fixing the rotating disk 4 to protect the rotating disk 4 made of a glass. Further, the inner rings and outer rings of the both bearings 11, 8 supporting the output shaft 14 of the rotor 7 are respectively bonded by the adhesive agent 19 in the state where a pre load is applied by a jig in order to prevent vibration of the rotor 7. In addition, the waveform washer is disposed between the load side bearing 11 and the load side bracket 13.

Herewith, even when an excessive thrust force is applied to the output shaft 14 of the motor and the adhesive of the both bearings 11, 8 is peeled off, since a pre load is applied by the waveform washer 12, significant lowering of accuracy of the encoder can be prevented to prevent a bad influence to a peripheral device.

What is claimed is:

1. A motor with an encoder comprising:
a motor; and
an encoder disposed at an anti-load side of the motor, wherein
the motor includes an output shaft rotatably supported by a load side bearing and an anti-load side bearing, and an anti-load side bracket including a bearing cover for supporting the anti-load side bearing by an inner circumferential part and covering an anti-load side part of the anti-load side bearing,
the encoder includes a rotating part coupled with the output shaft and a fixed part attached to the anti-load side bracket,
the rotating part includes a hub fixed at an end of the output shaft at the anti-load side, a shaft center of the hub being matched with a shaft center of the output shaft, and a rotating disk fixed at an anti-load side end of the hub,
the fixed part includes a fixed slit disposed at a load side of the rotating disk via an encoder gap in a shaft direction,
the hub includes a stopper that is bumped against the bearing cover of the anti-load side bracket when the output shaft is moved in a load side shaft direction, and
the stopper is formed to protrude from an outer circumferential surface of the hub, and a stopper gap which is a moving distance of the stopper that is moved in the load side shaft direction to bump against the anti-load side bracket is smaller than the encoder gap.

2. The motor with the encoder according to claim 1, wherein
the hub is disposed to oppose to an inner ring of the anti-load side bearing, and a shim having a ring shape for adjusting the gap of the stopper in the shaft direction is disposed between the stopper of the hub and the inner ring of the anti-load side bearing.

3. The motor with the encoder according to claim 1, wherein
inner rings and outer rings of the both bearings are respectively bonded in the state where a pre load is applied to the load side bearing and the anti-load side bearing supporting the output shaft of the rotor.

4. The motor with the encoder according to claim 1, wherein
a waveform washer is disposed between a load side bracket and the load side bearing.

5. The motor with the encoder according to claim 1, wherein
the stopper is formed by a self-lubricated material.

6. The motor with the encoder according to claim 1, wherein
a self-lubricated material is coated on a surface of the stopper.

7. The motor with the encoder according to claim 1, wherein
a labyrinth structure is formed by a gap formed between an outer circumferential surface of an end of the hub at an anti-load side bearing side and an inner circumferential surface of the bearing cover, and by the stopper gap.

* * * * *